United States Patent [19]

Narayan et al.

[11] Patent Number: 6,096,237
[45] Date of Patent: Aug. 1, 2000

[54] POLYMERIC MDI COMPOSITIONS FOR USE IN THERMOFORMABLE FOAMS

[75] Inventors: Thirumurti Narayan; Hans J. Koller, both of Grosse Ile, Mich.

[73] Assignee: BASF Corporation, Mt. Olive, N.J.

[21] Appl. No.: 08/899,252

[22] Filed: Jul. 23, 1997

[51] Int. Cl.[7] .......................... C07C 265/12; C08G 18/76
[52] U.S. Cl. ...................... 252/182.21; 521/160; 528/67; 560/359
[58] Field of Search ....................... 252/182.21; 521/160; 528/67; 560/359

[56] References Cited

U.S. PATENT DOCUMENTS

| | | | |
|---|---|---|---|
| 4,042,751 | 8/1977 | Roth | 264/321 |
| 4,743,626 | 5/1988 | Narayan | 521/160 |
| 4,743,627 | 5/1988 | Narayan et al. | 521/160 |
| 4,937,012 | 6/1990 | Kan et al. | 521/161 |
| 5,114,989 | 5/1992 | Elwell et al. | 521/159 |
| 5,132,334 | 7/1992 | Gansen et al. | 521/160 |
| 5,169,878 | 12/1992 | Chen et al. | 521/161 |
| 5,208,269 | 5/1993 | Brown | 521/125 |
| 5,216,035 | 6/1993 | Harrison et al. | 521/51 |
| 5,236,960 | 8/1993 | Harrison et al. | 521/51 |
| 5,258,417 | 11/1993 | Narayan | 521/160 |
| 5,284,880 | 2/1994 | Harrison et al. | 521/51 |
| 5,338,820 | 8/1994 | Harrison et al. | 521/51 |
| 5,416,125 | 5/1995 | Liman et al. | 521/160 |
| 5,436,277 | 7/1995 | Narayan et al. | 521/160 |
| 5,459,221 | 10/1995 | Narayan et al. | 528/67 |
| 5,491,252 | 2/1996 | Narayan et al. | 560/26 |
| 5,510,053 | 4/1996 | Narayan et al. | 252/182.2 |
| 5,530,034 | 6/1996 | Narayan et al. | 521/159 |
| 5,539,009 | 7/1996 | Narayan et al. | 521/159 |
| 5,539,010 | 7/1996 | Narayan et al. | 521/159 |

*Primary Examiner*—Rabon Sergent
*Attorney, Agent, or Firm*—Fernando A. Borrego

[57] ABSTRACT

The present invention relates generally to polyisocyanate compositions for use in polyurethane thermoformable foams. The polyisocyanate compositions of the present invention which are also useful as binder/hardeners for prefoamed products offer improved stability at relatively low temperatures over other known polymeric diphenylmethane diisocyanate compositions.

30 Claims, No Drawings

POLYMERIC MDI COMPOSITIONS FOR USE IN THERMOFORMABLE FOAMS

FIELD OF THE INVENTION

The present invention relates to polyisocyanate compositions, and more particularly to polymethylene polyphenylene polyisocyanate based compositions useful in thermoformable foams.

BACKGROUND OF THE INVENTION

Polyisocyanate compositions per se have been utilized for years in association with polyols in the presence of catalysts and blowing agents to manufacture polyurethane foams. For example, certain polymethylene polyphenylene polyisocyanate (PMDI) compositions have been employed in view of its capacity for the absorption of excess isocyanate in the foam. However, PMDI, as currently formulated in the art, i.e., containing at least about 65.0 weight percent oligomers of MDI, is generally considered unsuitable for this purpose because of its relatively high viscosity of at least about 200 centipoise at 25° C. In an effort to address this disadvantage, attempts have been made to dilute known PMDI compositions with a solvent such as 1,1,1-trichloroethane to reduce the viscosity. However, the resulting solution is considered to be environmentally unsuitable.

Further, the use of such a solvent adds to processing costs which in turn is reflected in the cost of the resulting product.

Thus, in an effort to address the need in the art for a PMDI composition, lower viscosity PMDI compositions such as those having a viscosity of about 50 centipoise at 25° C. have been employed. However these compositions also resulted in certain disadvantages such as a sensitivity to temperatures below about 60° F. apparently due to the high concentration of 4,4' MDI, i.e., 65.0 weight percent or more. As a consequence of this temperature sensitivity, in order to be useful, the resulting polyisocyanate compositions require heated storage and transportation, thus increasing costs.

SUMMARY OF THE INVENTION

Accordingly, the present invention relates to polyisocyanate compositions useful in the production of polyurethane foam products wherein the polyisocyanate composition is storage stable at relatively low temperatures and gives rise to foams which have good flow characteristics and relatively fast demold times. The polyisocyanate composition of the present invention comprises:

(a) less than about 65.0 weight percent diphenylmethane 4,4'-diisocyanate based on a total polyisocyanate composition weight of 100.0 percent; and (b) at least one monomer or oligomer selected from the group consisting of a diphenylmethane 2,2'-diisocyanate, diphenylmethane, 2,4'-diisocyanate, a 3-ring diphenylmethane diisocyanate, 4-ring and higher molecular weight oligomers, and mixtures thereof;

wherein the resulting isocyanate composition has an average viscosity of less than about 150 centipoise at 25° C.

Under a preferred embodiment, the invention relates to a polyisocyanate composition comprising:

(a) between about 0.01 to about 4.0 weight percent of diphenylmethane 2,2'-diisocyanate;

(b) between about 3.0 weight percent to about 20.0 weight percent of a diphenylmethane 2,4'-diisocyanate;

(c) between about 30.0 weight percent to about 60.0 weight percent of a diphenylmethane 4,4'-diisocyanate;

(d) between about 10.0 weight percent to about 24.0 weight percent of a 3-ring diphenylmethane diisocyanate; and (e) between about 20.0 weight percent to about 40.0 weight percent of a 4-ring diphenylmethane diisocyanate and higher molecular weight oligomers;

wherein the resulting polyisocyanate composition has an average viscosity of less than about 150 centipoise at 25° C. and the total of (a)–(e) equals 100.0 weight percent.

The present invention also relates to polyisocyanate compositions useful as binder/hardeners for prefoamed products.

Still another aspect of the present invention is that the resulting polyisocyanate composition is essentially solvent free.

The present invention also relates to methods of preparing polyurethane foams which employ the polyisocyanate compositions disclosed and preparing products employing the polyisocyanate compositions as binder/hardeners.

In general, it is contemplated that the polyisocyanate compositions of the present invention can be employed under any application where low density flexible foams are to be used.

DETAILED DESCRIPTION OF THE PREFERRED EMBODIMENT

The isocyanate compositions of the present invention are prepared by blending or otherwise mixing between about 30.0 to about 60.0 weight percent diphenylmethane 4,4'-diisocyanate with at least one monomer or oligomer selected from the group consisting of (a) less than about 65.0 weight percent diphenylmethane 4,4'-diisocyanate based on a total polyisocyanate composition weight of 100.0 percent; and (b) at least one monomer or oligomer selected from the group consisting of a diphenylmethane 2,2'-diisocyanate, diphenylmethane, 2,4'-diisocyanate, a 3-ring diphenylmethane diisocyanate, 4-ring and higher molecular weight oligomers, and mixtures thereof;

wherein the resulting isocyanate composition has an average viscosity of less than about 150 centipoise at 25° C.

Under a preferred embodiment, the invention relates to a polyisocyanate composition comprising:

(a) between about 0.01 to about 4.0 weight percent of diphenylmethane 2,2'-diisocyanate;

(b) between about 3.0 weight percent to about 20.0 weight percent of a diphenylmethane 2,4'-diisocyanate;

(c) between about 30.0 weight percent to about 60.0 weight percent of a diphenylmethane 4,4'-diisocyanate;

(d) between about 10.0 weight percent to about 24.0 weight percent of a 3-ring diphenylmethane diisocyanate; and (e) between about 20.0 weight percent to about 40.0 weight percent of a 4-ring diphenylmethane diisocyanate and higher molecular weight oligomers;

wherein the resulting polyisocyanate composition has an average viscosity of less than about 150 centipoise at 25° C. and the total of (a)–(e) equals 100.0 weight percent;

wherein the resulting isocyanate composition has an average viscosity of between about 70 to about 130 centipoise at 25° C. More preferably the polyisocyanate composition will have a viscosity of between about 90 to about 120, and still more preferably between about 100 to about 110 centipoise at 25° C.

The amount of diphenylmethane 4,4'-diisocyanate (4,4'-MDI) employed in the polyisocyanate composition of the present invention will preferably range from between about 35.0 to about 55.0 weight percent, and still more preferably from about 40.0 to about 45.0 weight percent based on a total polyisocyanate composition weight of 100.0 percent.

The amount of diphenylmethane 2,2'-diisocyanate (2,2'-MDI) employed in the polyisocyanate composition of the present invention will generally range from a negligible amount such as about 0.01 weight percent up to about 4.0 weight percent based on a 100.0 weight percent total for the composition. More preferably the amount of 2,2'-MDI will range from about 0.05 to about 3.0 weight percent and even more preferably from about 0.1 to about 2.0 weight percent.

The amount of diphenylmethane 2,4'-diisocyanate (2,4'-MDI) employed in the polyisocyanate composition of the present invention will generally range from about 3.0 to about 20.0 weight percent based on a total composition weight of 100.0 percent. More preferably, the amount of 2,4'-MDI will range from about 5.0 weight percent to about 18.0 weight percent and still more preferably from about 7.0 weight percent to about 15.0 weight percent. Thus, the ratio of diphenylmethane 2,4' diisocyanate to 4,4' diisocyanate in the polyisocyanate composition is from about 10:90 to about 28:72.

The amount of 3-ring diphenylmethane diisocyanate (3-ring MDI) employed in the polyisocyanate composition of the present invention will generally range from about 10.0 weight percent to about 24.0 weight percent again based on a total composition weight of 100.0 percent. More preferably the amount of 3-ring-MDI will range from about 13.0 weight percent to about 21.0 weight percent with a still more preferable range being 15.0 to 18.0 weight percent.

The amount of 4-ring diphenylmethane diisocyanate (4-ring MDI) and higher molecular weight oligomers employed in the polyisocyanate composition will range from 20.0 to about 40.0 weight percent and more preferably from about 22.0 to about 38.0 weight percent. Under a still more preferable embodiment the range will be between about 24.0 to about 36.0 weight percent based on a total of 100.0 weight percent for the polyisocyanate composition.

A unique aspect of the present invention is that the polyisocyanate composition is essentially solvent free. By solvent free it is meant that the composition will include no more than 1.0 weight percent solvent and more preferably less than 0.5 weight percent solvent based on the total weight of the polyisocyanate composition.

The polyisocyanate compositions of the present invention have an average free NCO content of at least 24.0 percent. Preferably the average free NCO content will range from about between about 28.0 to 33.5 percent, and more preferably from 30.0 to 32.0 percent.

The polyisocyanate compositions of the present invention can be used to form a variety of commercial products, including but not limited to, automotive applications such as pillars and headliners for examples, such as those described in U.S. Pat. No. 4,042,751, the disclosure of which is hereby expressly incorporated by reference.

To prepare the polyurethane foams employing the above described polyisocyanate compositions, an isocyanate reactive composition is introduced to the polyisocyanate composition at an equivalent ratio of between about 2:1 to about 1:1.5 polyisocyanate to isocyanate reactive composition. The isocyanate reactive composition generally includes a compound having at least two isocyanate reactive hydrogens; a blowing agent; a catalyst and optionally chain extenders, surfactants, anti-oxidants, flame retardants, stabilizers, plasticizers, fillers and mixtures thereof.

Examples of compounds having at least two isocyanate active hydrogens include polythioether polyols, polyester amides and polyacetals containing hydroxyl groups, amine terminated polyoxyalkylene polyethers, and preferably, polyester polyols, polyoxyalkylene polyether polyols, and graft dispersion polyols. In addition, mixtures of at least two of the aforesaid polyols can be used as long as the combination has an average hydroxyl number in the aforesaid range.

The term "polyester polyol" as used in this specification and claim includes any minor amounts of unreacted polyol remaining after the preparation of the polyester polyol and/or unesterified polyol (e.g., glycol) added after the preparation of the polyester polyol. The polyester polyol can include up to about 40 weight percent free glycol.

Suitable polyester polyols can be produced, for example from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, fumaric acid, phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono- or di-esters of alcohols with 1 to 4 carbons, or dicarboxylic acid anhydrides. Dicarboxylic acid mixtures of succinic acid, glutaric acid and adipic acid in quantity ratios of 20–35:35–50:20–32 parts by weight are preferred, especially adipic acid. Examples of divalent and multivalent alcohols, especially diols, include ethanediol, diethylene glycol, 1,2-and 1,3-propanediol, dipropylene glycol, 1,4-butanediol, 1,5-pentanediol, 1,6-hexanediol, 1,10-decanediol, glycerine and trimethylolopropanes, tripropylene glycol, tetraethylene glycol, tetrapropylene glycol, tetramethylene glycol, 1,4-cyclohexane-dimethanol, ethanediol, diethylene glycol, 1,4-butanedio, 1,5-pentanediol, 1,6-hexanediol, or mixtures of at least two of these diols are preferred, especially mixtures of 1,4-butanediol, 1,5-pentanediol, and 1,6-hexanediol. Furthermore, polyester polyols of lactones, e.g., e-caprolactone or hydroxycarboxylic acids, e.g., ω-hydroxycaprioc acid, may also be used.

The polyester polyols can be produced by polycondensation of organic polycarboxylic acids, e.g., aromatic or preferably aliphatic polycarboxylic acids and/or derivatives thereof and multivalent alcohols in the absence of catalysts or preferably in the presence of esterification catalysts, preferably in an atmosphere of inert gases, e.g., nitrogen, carbon dioxide, helium, argon, etc., in the melt at temperatures of 150° to 250° C., preferably ° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under pressure of less than 500 mbar, preferably 50 to 150 mbar. The reaction can be carried out as a batch process or continuously. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for aziotropic distillation of the water of condensation.

To produce the polyester polyols, the organic polycarboxylic acids and/or derivatives thereof and multivalent alcohols are preferably polycondensed in a mole ratio of 1:1–1.8, more preferably 1:1.05–1.2.

After transesterification or esterification, the reaction product can be reacted with an alkylene oxide to form a polyester polyol mixture. This reaction desirability is catalyzed. The temperature of this process should be from about 80° to 170° C., and the pressure should generally range from about 1 to 40 atmospheres.

While the aromatic polyester polyols can be prepared from substantially pure reactant materials, more complex ingredients are advantageously used, such as the side stream, waste or scrap residues from the manufacture of phthalic acid, terephthalic acid, dimethyl terephthalate, polyethylene, terephthalate, and the like.

Other residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

Polyoxyalkylene polyester polyols, which can be obtained by known methods, are particularly preferred for use as the compounds having at least two isocyanate active hydrogens. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups; preferably secondary hydroxyl groups from the addition of propylene oxide onto an initiator because these groups are slower to react.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wirtz in 1859 and *Encyclopedia of Chemical Technology*, Vol. 7, pp. 257–262, published by Interscience Publishers, Inc. (1951) or in U.S. Pat. No. 1,922,459.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Particularly preferred in the polyol composition is at least one polyol which is initiated with a polyhydric alcohol having 4 or more hydroxyl group 5, such as sucrose, or a mixture of initiators employing a polyhydric alcohol having at least 4 hydroxyl groups. In particular, it is preferred that the pH neutral polyol be made with an initiator or mixture of initiators employing a polyhydric alcohol having 4 or more hydroxyl groups such as sucrose, or a sucrose/glycerine mixture.

Suitable organic amine initiators which may be condensed with alkylene oxides include aromatic amines such as aniline, N-alkylphenylenediamines, 2,4'-, 2,2'-, and 4,4'-methylenedianiline, 2,6- or 2,4-toluenediamine, vicinal touenediamines, o-chloro-aniline, p-aminoaniline, 1,5-diaminonaphthalene, methylene dianiline, the various condensation products of aniline and formaldehyde, and the isomeric diaminotoluenes; and aliphatic amines such as mono-, di- and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine.

Suitable polyhydric polythioethers which may be condensed with alkylene oxides include the condensation product of thiodiglycol or the reaction product of a dicarboxylic acid such as disclosed above for the preparation of the hydroxyl-containing polyesters with any other suitable thioether glycol.

The hydroxyl-containing polyester may also be a polyester and such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include akanethiols containing at least two -SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Also suitable as the polyol are polymer modified polyols, in particular, the so-called graft polyols. Graft polyols are well known in the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. Nos. 4,690,956; and in 4,524,157; all of which patents are herein incorporated by reference.

Non-graft polymer modified polyols are also useful, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersion also containing biuret linkages as taught by U.S. Pat. No. 4,359,541. Other polymer modified polyols may be prepared by the in situ size reduction of polymers until the particle size is less than 20 $\mu$m, preferably less than 10 $\mu$m.

To promote fast demold times, it is preferable that at least one of the polyether polyols, more preferably all of the polyether polyols, be terminated with primary hydroxyl groups rather than secondary hydroxyl groups.

Hydroxyl-functional and amine-functional chain extenders are optional and include hydroxyl-functional chain extenders such as ethylene glycol, glycerine, trimethylolpropane, 1,4-butanediol, propylene glycol, dipropylene glycol, 1,6-hexanediol, and the like; and amine-functional chain extenders such as the sterically hinder diethyltoluene diamine and the other hindered amines disclosed in Weber U.S. Pat. No. 4,218,543; phenylene diamine, 1,4-cyclohexane-bis-(methylamine), ethylenediamine, diethylenetriamine, N-(2-hydroxypropyl)-ethylenediamine, N,N'-di(2-bydroxypropyl) ethylenediamine, piperazine, and 2-methylpiperazine. In low density polyurethane forms, the amount of chain extender is generally less than 30 weight percent based on the total weight of the resin component, preferably less than 25 weight percent, more preferably no chain extenders are present. In resin components exclusively containing hydroxyl functional tertiary amine polyols, chain extenders are not necessary.

Another feature of the present invention is the use of water, which reacts with the isocyanate mixture and provides carbon dioxide, as blowing agent. Preferably used is between about 0.05 weight percent to about 3.0 weight percent, and in particular between about 1.0 weight percent to about 2.0 weight percent, of water based on the weight of the isocyanate reactive composition. Optionally mixtures of water and chemically inert, low-boiling, halogenated hydrocarbons can also be used as foaming agents. These include, for instance, halogenated hydrocarbons having boiling points below 50° C., preferably between −50° C. and 30° C. at atmospheric pressure. The following listing is used as an example: halogenated hydrocarbons such as monochlorodifluoromethane, dichloromonofluoromethane, dichlorofluoromethane, and trichlorofluoromethane and their mixtures, and hydrocarbons such as propane, n-butane, and isobutane as well as dimethyl ether. Suitable mixtures of water and halogenated hydrocarbons generally consist of between about 5.0 to about 70.0 percent by weight, preferably between about 10.0 to about 50.0 percent by weight, of water and between about 30.0 to about 95.0 percent by weight, preferably between about 50.0 to about 90.0 percent by weight, of halogenated hydrocarbons, with the percent by weight being based on the total weight of the blowing agent employed.

The required quantities of blowing agent can be determined experimentally in a very simple manner as a function of the mixing ratio of water to halogenated blowing agents as well as the desired density of the foam.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine 3-methoxypropyldimethylamine, N, N, NI-trimethylisopropypropylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams generally collapse or contain very large uneven cells. Numerous surface-active agents have been found satisfactory. Nonionic surface-active agents are preferred. Of these, the nonionic surface-active agents such as the well-known silicones have been found particularly desirable. Other surface-active agents which are operative, although not preferred, include paraffin oils, castor oil, turkey red oil, polyethylene glycol ethers of long chain alcohols tertiary amine or alkanolamine salts of long chain alkyl acid sulfate esters, alkyl sulfonic esters, and alkyl arylsulfonic acids.

Among the flame retardants which may be employed are pentabromodiphenyl oxide, dibromopropanol, tris($\beta$-chloropropyl)phosphate, 2,2-bis(bromoethyl) 1,3-propanediol, tetrakis(2-chloroethyl)ethylene diphosphate, tris(2,3-dibromopropyl)phosphate, tris($\beta$-chloroethyl) phosphate, tris(1,2-dichloropropyl)phosphate, bis-(2-chloroethyl) 2-chloroethylphosphonate, molybdenumtrioxide, ammoniummolybdate, ammonium phosphate, pentabromodiphenyloxide, tricresyl phosphate, hexabromocyclododecane, melamine, and d ibromoethyid ibromocyclohexane. The concentrations of flame retardant compounds which may be employed range from 5.0 to 25.0 parts per 100 parts of polyol mixture.

Further details concerning the above-mentioned other commonly used auxiliaries and additives are contained in the literature, for instance, in the monograph by J. H. Saunders and K. C. Frisch, "High Polymers," Volume XVI, Polyurethanes, Part 1 and 2, Interscience Publishers, 1962 and 1964.

As shall be understood by those skilled in the art, the foaming reaction is accomplished by combining the isocyanate reactive composition including a compound having at least two isocyanate reactive hydrogens, the blowing agent, catalyst and optional additives and auxiliaries with the above described polyisocyanate compositions in a mold generally operable at between about 80° F. and about 110° F.

Alternatively, when the above described polyisocyanate compositions are employed as binder/hardeners for prefoamed products, the prefoamed product is impregnated with a predetermined amount of the polyisocyanate composition at the desired locations in order to provide the product with different degrees of flexibility. Thereafter the isocyanate reactive composition is applied to the prefoamed sheet in contact with the polyisocyanate composition of the present invention. As soon as the polyisocyanate and isocyanate reactive composition begin to become tacky during polymerization, a decorative coating is generally applied over the coated surfaces and the entire product is inserted into a mold wherein the final product is formed at elevated temperatures.

For a further understanding of the application process for the polyisocyanate compositions of the present invention, reference can be made to U.S. Pat. No. 4,042,751, the disclosure of which is hereby incorporated by reference.

The following examples illustrate the nature of the invention and should not be construed as limitations on the scope of the invention. Unless otherwise indicated, all amounts are given as weight percents.

Initially, the low temperature stability of the polyisocyanate composition of the present invention was tested as compared to blends employing varying amounts of 4,4-MDI. Samples of each of the polymeric MDI compositions as set forth in Table I below were stored in a freezer maintained at between −7 to −10° C. and checked daily for three months. It was observed that sample 6 crystallized after only 24 hours. Samples 1 and 5 showed visible amounts of sediment while samples 2–4 showed only trace amounts. Interestingly, sample 3 showed no sediment occurring after the three month test period.

TABLE I

| Sample | 1 | 2 | 3 | 4 | 5 | 6 |
|---|---|---|---|---|---|---|
| ISO A | 90.0 | 85.0 | 80.0 | 75.0 | 100.0 | 62.0 |
| ISO B | 10.0 | 15.0 | 20.0 | 25.0 | — | 13.0 |
| ISO C | — | — | — | — | — | 25.0 |
| NCO, wt. % | 31.4 | 31.5 | 31.7 | 31.9 | 31.8 | 32.0 |
| VISC. cps 25° C. | 128 | 107 | 89 | 75 | 200 | 48 |

ISO A is a solvent free polymethylene polyphenylisocyanate having a functionality of about 2.7 and an NCO content of about 31.8.

ISO B is a solvent free blend of 50.0% diphenylmethane 2,4'-diisocyanate and diphenylmethane 4,4'-diisocyanate having an average functionality of about 2.0 and an NCO content of about 33.0.

ISO C is a solvent free blend of 98.0% diphenylmethane 4,4'-diisocyanate and 2.0% diphenylmethane 2,4'-diisocyanate.

After conducting the sediment analysis, samples 2–4 of the above described were chosen as potential candidates and therefore were evaluated for their potential use as binder/hardeners in the production of thermoformable foams useful for vehicle headliners. To prepare the samples, a flexible polyurethane foam having a density of about 1.016 cpf was soaked in the compositions of samples 2 and 3.

Upon saturation the excess isocyanate was squeezed out and chopped fiberglass was sprayed onto each of the foam samples in a consistent amount. Thereafter, a mixture consisting of an amine catalyst (DMEA) and water was sprayed onto the foam compositions. The foam was then transferred to a heated mold (260°–325° F.) and the foam was thermoformed to shape and evaluated for various characteristics and properties as listed below:

| Test | Result | Requirement |
|---|---|---|
| Transverse Strength SAE 1949 rev. 8-81 | PASS | Minimum: 13.3N/76 mm |
| Ply Adhesion FLTM BN 13-1 (rev. 6-84) | PASS | Uncompressed areas: 2.2N/50 mm Compressed areas: 4.4N/50 mm |
| Resistance to Fade SAE J1885 (rev. 3-92) | PASS | Minimum rating of 3 with AATCC scale |
| Heat Aging ESB M15P1 | PASS | No shade alteration, blistering or loss of staining, shrinkage of bond |
| Heat Stability FLTM BN 113-2 (rev. 1-91) definition, deformation | PASS | Min. rating: 4 with AATCC scale. No delamination, lost definition, deformation |
| Fogging FLTM BO 116-03 (rev. 7-90) | PASS | Fog number minimum: 60. No oily film or oily droplets |
| Odor SAE J1351 (rev. 6-93) | PASS | Maximum odor rating: 2 |
| Mildew Resistance ESB M15P1-C (rev. 6-90) | PASS | No visual evidence of mildew, mildew growth or mildew odor |
| Flammability SAE J369 (rev. 6-89) | PASS | Maximum burnrate: 4"/minute |
| Stain Resistance of ID marking FLTM BO 12-6 (rev. 1-77) | PASS | No evidence of identification mark, bleedthrough on cover materials surface |
| Indentation and Recovery FLTM BO 111-02 (rev. 2-91) | PASS | The cover and base shell return to its original contour in 5 minutes |
| Sound Absorption ASTM C384 (rev. 5-85) | N/A | |
| Modified Environmental In-Car Aging ESB M15P1-C (rev. 6-90) | PASS | Sag - 13 mm max. No objectional surface imperfections |

The results tabulated above indicated that the isocyanate binder/hardner samples 2 to 4 of Table I meet all the requirements for a superior thermoformable foam.

What is claimed is:

1. A polyisocyanate composition comprising, based on the total weight of the composition:
   a) from about 35.0 to about 55.0 weight percent diphenylmethane 4,4'-diisocyanate;
   b) from about 7.0 to about 15.0 weight percent diphenylmethane 2,4'-diisocyanate;
   c) from about 0.01 to about 4.0 weight percent diphenylmethane 2,2'-diisocyanate;
   d) from about 10.0 to about 24.0 weight percent 3-ring polymethylene polyphenylpolyisocyanate; and
   e) from about 20.0 to about 40.0 weight percent 4-ring and higher oligomeric
      wherein the composition has an average viscosity of from about 70 to about 130 centipoise at 250° C., the weight percent amounts of components a)–e) total 100, and the weight percent ratio of diphenylmethane 2,4'-diisocyanate to diphenylmethane 4,4'-diisocyanate is between 1:5.5 to 1:2.5.

2. The composition of claim 1 wherein said diphenylmethane 4,4' diisocyanate is present in an amount of between about 40.0 to about 45.0 weight percent.

3. The composition of claim 1 wherein said diphenylmethane 2,2' diisocyanate is present in an amount of between about 0.05 to about 3.0 weight percent.

4. The composition of claim 1 wherein said diphenylmethane 2,2' diisocyanate is present in an amount of between about 0.1 to about 2.0 weight percent.

5. The composition of claim 1 wherein said 3-ring polymethylene polyphenylpolyisocyanate is present in an amount of between about 13.0 to about 21.0 weight percent.

6. The composition of claim 1 wherein said 3-ring polymethylene polyphenylpolyisocyanate is present in an amount of between about 15.0 to about 18.0 weight percent.

7. The composition of claim 1 wherein said 4-ring and higher oligomeric polymethylene polyphenylpolyisocyanate is present in an amount of between about 22.0 to about 38.0 weight percent.

8. The composition of claim 1 wherein said 4-ring and higher oligomeric polymethylene polyphenylpolyisocyanate is present in an amount of between about 24.0 to about 36.0 weight percent.

9. The composition of claim 1 having an average viscosity of between about 90 to about 120 centipoise at 25° C.

10. The composition of claim 1 having an average viscosity of between about 100 to about 110 centipoise at 25° C.

11. The composition of claim 1 having an average free NCO content of at least about 24.0 percent by weight.

12. The composition of claim 1 having an average free NCO content of between about 30.0 percent and about 32.0 percent by weight.

13. The composition of claim 1, wherein the composition is essentially solvent free.

14. A polyisocyanate composition comprising, based on the total weight of the composition:
   a) from about 0.1 to about 4.0 weight percent of diphenylmethane 2,2'-diisocyanate;
   b) from about 8.0 to about 15.0 weight percent of a diphenylmethane 2,4'-diisocyanate;
   c) from about 35.0 to about 55.0 weight percent of a diphenylmethane 4,4'-diisocyanate;
   d) from about 10.0 to about 24.0 weight percent of a 3-ring polymethylene polyphenylpolyisocyanate; and
   e) from about 20.0 to about 40.0 weight percent of bring and higher oligomeric polymethylene polyphenylpolyisocyanates;
   wherein the composition has an average viscosity of from about 70 to about 130 centipoise at 25° C., the weight ratio of said diphenylmethane 2,4' diisocyanate to diphenylmethane 4,4' diisocyanate is between 1:4.5 to 1:2.5, the weight percent amounts of components a)–e) total 100, and the composition is essentially solvent free.

15. The composition of claim 14 wherein said diphenylmethane 4,4' diisocyanate is present in an amount of between about 40.0 to about 45.0 weight percent.

16. The composition of claim 14 wherein said diphenylmethane 2,2' diisocyanate is present in an amount of between about 0.05 to about 3.0 weight percent.

17. The composition of claim 14 wherein said diphenylmethane 2,2' diisocyanate is present in an amount of between about 0.1 to about 2.0 weight percent.

18. The composition of claim 14 wherein said 3-ring polymethylene polyphenylpolyisocyanate is present in an amount of between about 13.0 to about 21.0 weight percent.

19. The composition of claim 14 wherein said 3-ring polymethylene polyphenylpolyisocyanate is present in an amount of between about 15.0 to about 18.0 weight percent.

20. The composition of claim 14 wherein said 4-ring and higher oligomeric polymethylene polyphenylpolyisocyanate is present in an amount of between about 22.0 to about 38.0 weight percent.

21. The composition of claim 14 wherein said 4-ring and higher oligomeric polymethylene polyphenylpolyisocyanate is present in an amount of between about 24.0 to about 36.0 weight percent.

22. The composition of claim 14 having an average viscosity of between about 90 to about 120 centipoise at 25° C.

23. The composition of claim 14 having an average viscosity of between about 100 to about 110 centipoise at 25° C.

24. The composition of claim 14 having an average free NCO content of at least about 24.0 percent by weight.

25. The composition of claim 14 having an average free NCO content of between about 30.0 percent and about 32.0 percent by weight.

26. A polyisocyanate composition comprising, based on the total weight of the composition:
   a) from about 0.1 to about 2.0 weight percent of diphenylmethane 2,2'-diisocyanate;
   b) from about 9.0 weight percent to about 15.0 weight percent of a diphenylmethane 2,4'-diisocyanate;
   c) from about 40.0 weight percent to about 45.0 weight percent of a diphenylmethane 4,4'-diisocyanate;
   d) from about 15.0 weight percent to about 18.0 weight percent of a 3-ring polymethylene polyphenylpolyisocyanate; and
   e) from about 24.0 weight percent to about 36.0 weight percent of 4-ring and higher oligomeric polymethylene polyphenylpolyisocyanates;
   wherein the composition has an average viscosity of from about 75 to about 120 centipoise at 25° C., the weight percent amounts of components a)–e) total 100, and the weight ratio of said diphenylmethane 2,4' diisocyanate to diphenylmethane 4,4' diisocyanate is between 1:5 to 1:2.67.

27. The composition of claim 26 having an average viscosity of between about 100 to about 110 centipoise at 25° C.

28. The composition of claim 26 having an average free NCO content of at least about 24.0 percent by weight.

29. The composition of claim 26 having an average free NCO content of between about 30.0 percent and about 32.0 percent by weight.

30. The composition of claim 26, wherein the composition is essentially solvent free.

* * * * *